United States Patent
Cuevas et al.

(10) Patent No.: US 6,422,591 B1
(45) Date of Patent: *Jul. 23, 2002

(54) VEHICLE OCCUPANT PROTECTION APPARATUS

(75) Inventors: Jess A. Cuevas, Scottsdale; Ahmad K. Al-Amin, Highley; Bryan W. Shirk, Mesa; Timothy A. Swann, Mesa; Roy D. Van Wynsberghe, Mesa, all of AZ (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,978

(22) Filed: Apr. 20, 1998

(51) Int. Cl.[7] .............................................. B60R 21/26
(52) U.S. Cl. ..................... 280/728.3; 280/731; 280/732
(58) Field of Search ............................. 280/728.3, 731, 280/732, 728.1, 728.2

(56) References Cited

U.S. PATENT DOCUMENTS

| | | | |
|---|---|---|---|
| 3,794,349 A | * | 2/1974 | Fuller |
| 4,327,937 A | * | 5/1982 | Scholz et al. ................. 180/90 |
| 4,925,209 A | * | 5/1990 | Sakurai .................... 280/728.3 |
| 5,060,972 A | | 10/1991 | Satoh et al. |
| 5,096,221 A | | 3/1992 | Combs et al. |
| 5,116,079 A | | 5/1992 | Rhodes, Jr. |
| 5,161,819 A | | 11/1992 | Rhodes, Jr. |
| 5,209,510 A | * | 5/1993 | Mamiya |
| 5,219,177 A | | 6/1993 | Wang |
| 5,238,264 A | * | 8/1993 | Barnes |
| 5,301,966 A | | 4/1994 | Sakata |
| 5,320,381 A | * | 6/1994 | Barnes et al. ............. 280/728.3 |
| 5,342,083 A | | 8/1994 | Gentile et al. |
| 5,398,959 A | * | 3/1995 | Avila ........................ 280/728.3 |
| 5,531,471 A | * | 7/1996 | Terai .......................... 280/732 |
| 5,609,355 A | * | 3/1997 | Smydra et al. ........... 280/728.3 |
| 5,641,178 A | | 6/1997 | Lee |
| 5,651,562 A | * | 7/1997 | Hagen et al. ............. 280/728.3 |
| 5,725,265 A | * | 3/1998 | Baber ......................... 293/107 |
| 5,794,968 A | * | 8/1998 | Yamamoto et al. ...... 280/728.2 |
| 5,851,023 A | * | 12/1998 | Nagata et al. ............ 280/728.2 |
| 5,887,891 A | * | 3/1999 | Taquchi et al. .......... 280/728.2 |
| 6,010,146 A | * | 1/2000 | Otsuka et al. ........... 280/728.2 |

FOREIGN PATENT DOCUMENTS

| | | | | |
|---|---|---|---|---|
| DE | 92091253 | | 11/1992 | |
| DE | 19616977 | | 4/1997 | |
| JP | 4078637 | * | 3/1992 | .............. 280/728.3 |

* cited by examiner

Primary Examiner—Paul N. Dickson
(74) Attorney, Agent, or Firm—Tarolli, Sundheim, Covell, Tummino & Szabo L.L.P.

(57) ABSTRACT

An apparatus (10) includes a frame structure (32) defining a deployment opening (40), an inflatable vehicle occupant protection device (14) aligned with the deployment opening (40), and a deployment structure (24) extending across the deployment opening (40). The deployment structure (24) has first and second locking portions (70, 72) in releasably interlocked engagement with the frame structure (32) at locations spaced apart across the deployment opening (40). The deployment structure (24) is configured to undergo non-rupturing deflection under the influence of inflation fluid pressure forces applied by the protection device (14). Such non-rupturing deflection of the deployment structure (24) moves the first locking portion (70) partially out of interlocked engagement with the frame structure (32), and moves the second locking portion (72) fully out of interlocked engagement with the frame structure (32).

19 Claims, 3 Drawing Sheets

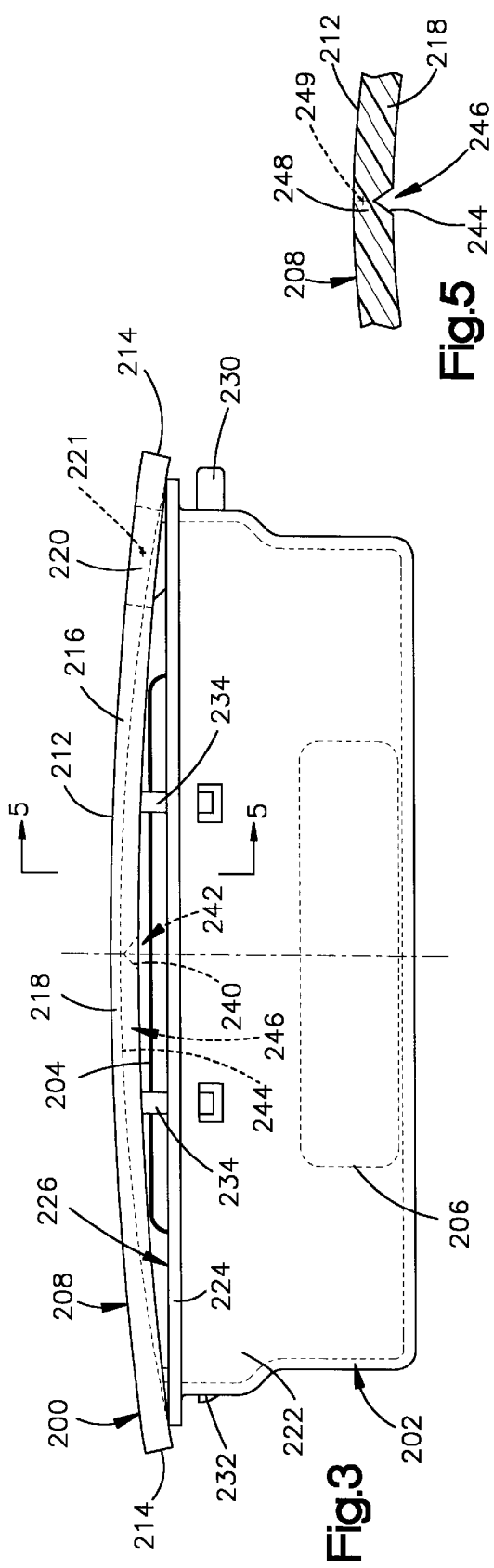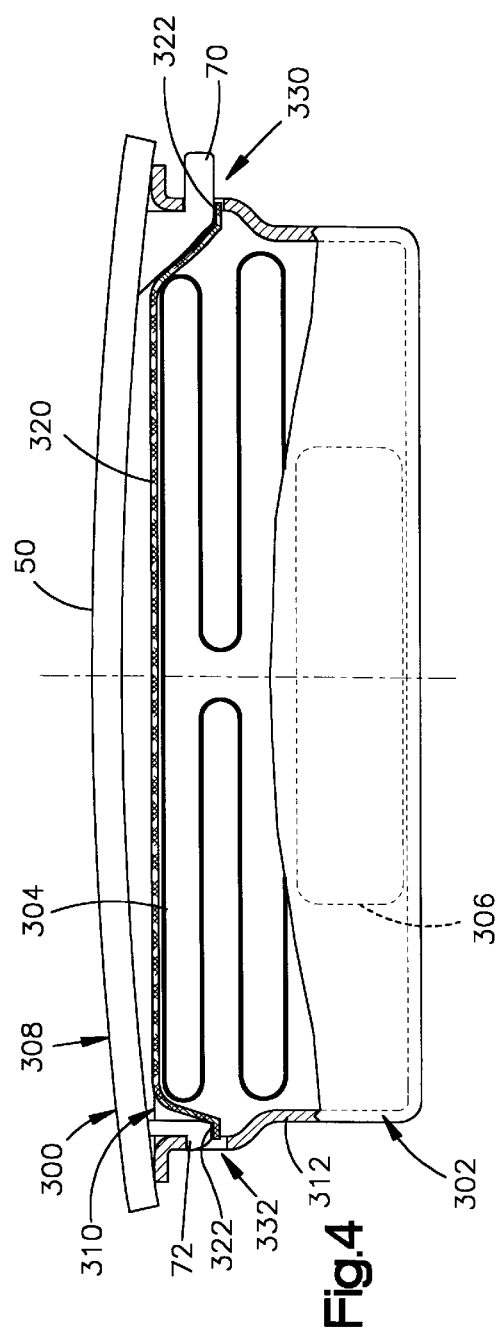

VEHICLE OCCUPANT PROTECTION APPARATUS

FIELD OF THE INVENTION

The present invention relates to an inflatable vehicle occupant protection device, and particularly relates to a deployment structure for covering the protection device in a vehicle.

BACKGROUND OF THE INVENTION

An inflatable vehicle occupant protection device, such as an air bag, is inflated when a vehicle experiences a crash. Inflation fluid is then directed to flow from an inflator into the air bag to inflate the air bag. When the air bag is inflated, it extends into the vehicle occupant compartment to help protect an occupant of the vehicle from a forceful impact with parts of the vehicle as a result of the crash.

A deployment structure conceals the air bag and the inflator from view in the vehicle occupant compartment. The deployment structure includes a pivotal deployment door which extends over the air bag. As the inflation fluid begins to flow from the inflator into the air bag, it moves the air bag against the deployment door. The deployment door is opened by the air bag as the inflation fluid continues to inflate the air bag into the vehicle occupant compartment.

SUMMARY OF THE INVENTION

In accordance with the present invention, an apparatus comprises a frame structure defining a deployment opening, an inflatable vehicle occupant protection device aligned with the deployment opening, and a deployment structure extending across the deployment opening. The deployment structure has first and second locking portions in releasably interlocked engagement with the frame structure at locations spaced apart across the deployment opening.

The deployment structure is configured to undergo non-rupturing deflection under the influence of inflation fluid pressure forces applied by the protection device. The non-rupturing deflection of the deployment structure moves each of the locking portions outward of interlocked engagement with the frame structure. The first locking portion is configured to move only partially out of interlocked engagement with the frame structure upon such non-rupturing deflection of the deployment structure. However, the second locking portion is configured to move fully out of interlocked engagement with the frame structure upon such non-rupturing deflection of the deployment structure.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 3 is a side view of an apparatus comprising a second embodiment of the present invention;

FIG. 4 is a side view, partly in section, of an apparatus comprising a third embodiment of the present invention; and FIG. 5 is a detail view of part of the apparatus of FIG. 3.

DESCRIPTION OF PREFERRED EMBODIMENTS

Figure 1:
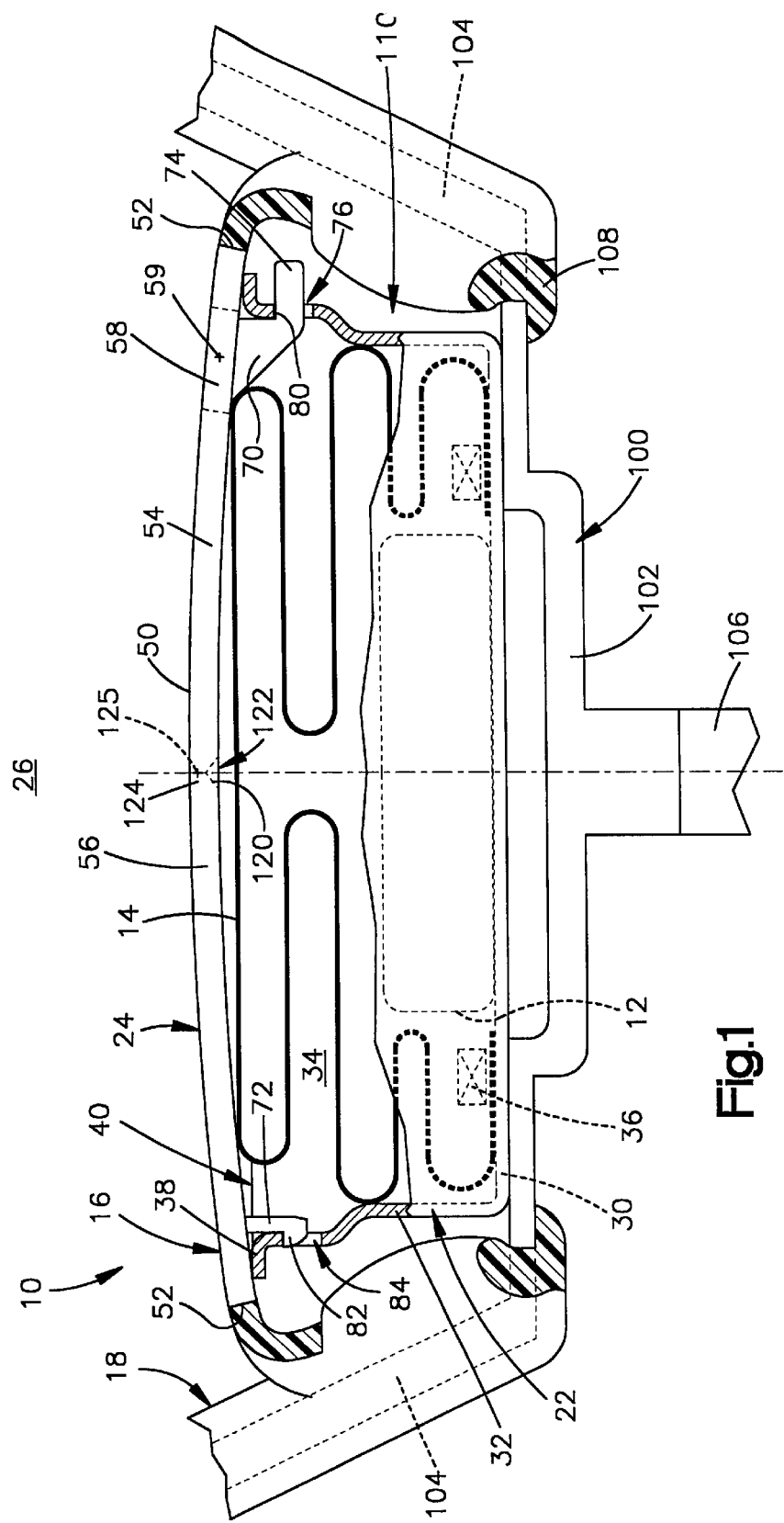
FIG. 1 is a side view, partly in section, of an apparatus comprising a first embodiment of the present invention.

An apparatus 10 comprising a first embodiment of the present invention is shown in FIG. 1. The apparatus 10 includes an inflator 12 and an inflatable vehicle occupant protection device 14 which is commonly referred to as an air bag. In the first embodiment of the present invention, air bag 14 and the inflator 12 are parts of an air bag module 16 which is mounted on a vehicle steering wheel 18.

The module 16 comprises an assembly of parts that are interconnected separately from the steering wheel 18. In addition to the air bag 14 and the inflator 12, such parts include a reaction structure 22 which contains the air bag 14 and the inflator 12, and a deployment structure 24 which conceals the air bag 14 and the other parts of the module 16 from view in the vehicle occupant compartment 26. When the air bag 14 is inflated, it extends into the vehicle occupant compartment 26 between the steering wheel 18 and the driver of the vehicle to help protect the driver from a forceful impact with the steering wheel 18.

The inflator 12 is a known device comprising a source of inflation fluid for inflating the air bag 14. The inflator 12 may thus contain pressurized inflation fluid, a body of ignitable gas-generating material, or a combination of pressurized inflation fluid and ignitable material for heating the inflation fluid. The ignitable material may comprise a fuel gas or a combustible mixture of gases, as known in the art. As further known in the art, the inflator 12 is actuated upon the occurrence of a vehicle crash having at least a threshold level of severity for which inflation of the air bag 14 is desired to help protect the driver. The inflation fluid then flows rapidly from the inflator 12 into the air bag 14 to inflate the air bag 14 outward from the steering wheel 18 toward the driver.

The air bag 14 is constructed of one or more panels of any suitable material known in the art, including woven materials and plastic films. The panels of air bag material are interconnected along seams that are formed by stitches, ultrasonic welds, adhesives, heat staking, or the like, depending on the particular air bag material of which the panels are formed. Preferably, the air bag 14 is constructed of panels formed of a nylon fabric which is coated with silicone. Any suitable arrangement of folds can be used to place the air bag 14 in the folded, uninflated condition in which it is shown schematically in FIG. 1.

The reaction structure 22 comprises a reaction plate 30 and a frame 32. The frame 32 extends about the periphery of the reaction plate 30, and projects upward (as viewed in FIG. 1) to define the depth and peripheral boundaries of a storage compartment 34 in which the inflator 12 and the folded air bag 14 are received. A retainer assembly 36 (shown schematically) interconnects the inflator 12, the air bag 14, and the reaction plate 30 in a known manner. A rim portion 38 of the frame 32 defines a deployment opening 40 through which the air bag 14 emerges from the storage compartment 34 upon being inflated into the vehicle occupant compartment 26.

The deployment structure 24 in the first embodiment of the present invention is a one-piece structure formed of molded plastic material. By "one-piece" it is meant that the deployment structure 24 is made from a single homogeneous material, and is a single unit free of separate but joined elements. A panel portion 50 of the deployment structure 24 extends fully across the deployment opening 40, and projects laterally beyond the rim 38 of the frame 32 fully about the periphery of the frame 32. Although its peripheral shape m ay vary, the panel 50 has a generally rectangular peripheral shape defined by a pair of opposite side edges 52 extending between a pair of opposite end edges 54 (one of which is visible in the end view of FIG. 1).

The panel 50 defines a deployment door 56. A generally distinct section 58 of the panel 50 functions as a deflectable hinge for movement of the door 56 pivotally about an axis 59. The hinge 58 extends fully along the length of the panel 50 at a location spaced a short distance from one of the side edges 52. The door 56 comprises the entire rectangular portion of the panel 50 that is located between the hinge 58 and the other side edge 52.

The deployment structure 24 further has locking portions 70 and 72 projecting from the panel 50 into engagement with the frame 32. The locking portions 70 and 72 hold the deployment structure 24 on the frame 32 in the installed position in which it is shown in FIG. 1. Specifically, the first locking portion 70 projects inward through the deployment opening 40 at a location beside the hinge 58, and is elongated in a direction generally parallel to the hinge 58. A lip 74 at the lower end of the first locking portion 70 is received through a slot 76 in the frame 32. The lip 74 fits tightly against an edge surface 80 of the frame 32 which defines the upper side of the slot 76 so as to hold the adjacent portion of the panel 50 firmly against the rim 38 of the frame 32.

The second locking portion 72 projects inward through the deployment opening 40 at a location opposite the first locking portion 70, and also has a lip 82 received tightly within a slot 84 in the frame 32. Unlike the first locking portion 70, the second locking portion 72 is not elongated lengthwise of the deployment door 56. Instead, the second locking portion 72 is one of a plurality of separate locking portions which are spaced from each other in a row extending lengthwise of the deployment door 56. The second locking portions 72 are alike, and each is received tightly within a corresponding slot 84 in the same manner. The second locking portions 72 thus hold the adjacent portion of the panel 50 firmly against the rim 38.

The deployment structure 24 is installed on the frame 32 by first inserting the lip 74 on the first locking portion 70 through the corresponding slot 76, and by subsequently pressing the second locking portions 72 downward through the deployment opening 40 until their lips 82 snap into the corresponding slots 84. Importantly, the lip 74 on the first locking portion 70 extends fully through the slot 76, and projects a substantial distance outward from the frame 32 beside the slot 76. The lips 82 on the second locking portions 72 preferably extend fully through the corresponding slots 84, but do not project substantially outward from the frame 32 adjacent the slots 84.

The steering wheel 18 has an armature 100 with distinct portions defining a hub 102, a circular rim (not shown), and a plurality of spokes 104 projecting from the hub 102 to the rim. The hub 102 is mounted on an input shaft 106 in a vehicle steering column. A molded plastic cover 108 on the armature 100 encapsulates the spokes 104 and the rim. When the deployment structure 24 and the other parts of the module 16 have been interconnected, as described above, the module 16 is received within a cavity 110 defined by the cover 108. The module 16 is then fixed to the armature 100 in a known manner, such as by the use of fasteners (not shown) that connect the reaction plate 30 directly to the hub 102. The edges 52 and 54 of the panel 50 fit closely against adjacent edges of the cover 108 fully about the periphery of the panel 50.

As inflation fluid begins to flow from the inflator 12 into the air bag 14, it causes the air bag 14 to apply fluid pressure forces outwardly against the deployment structure 24 at the panel 50. In accordance with the present invention, the deployment structure 24 is configured to undergo non-rupturing deflection which opens the deployment door 56 under the influence of such fluid pressure forces.

Figure 2:
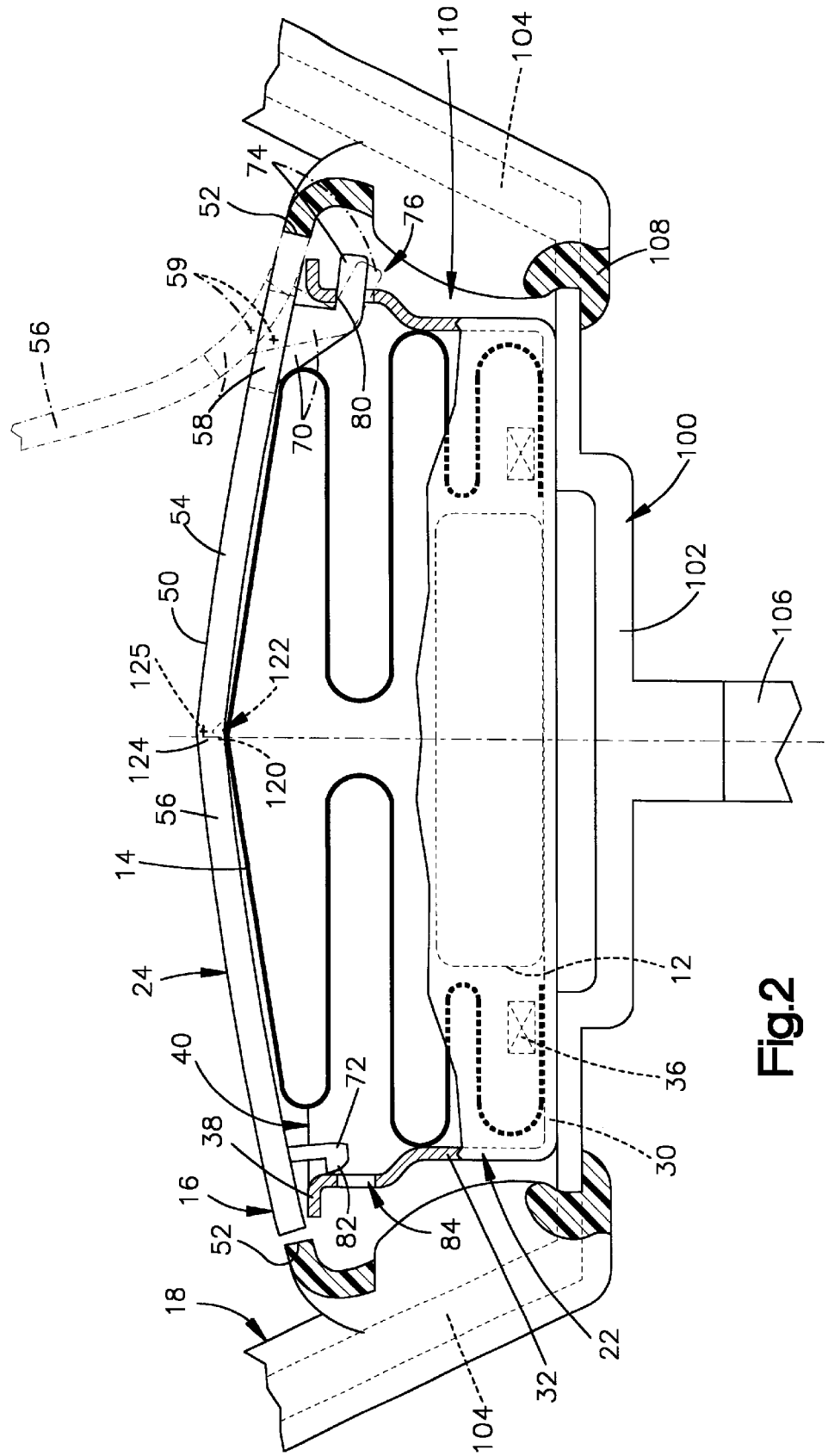
FIG. 2 is a view similar to FIG. 1 showing parts in different positions.

Specifically, the fluid pressure forces applied by the air bag 14 induce bending stresses in the panel 50. The bending stresses bow the panel 50 outward of the deployment opening 40 between the locking portions 70 and 72 at the opposite sides of the deployment opening 40. This deflection of the panel 50 moves the locking portions 70 and 72 oppositely toward each other across the deployment opening 40, and thus moves them outward of the corresponding slots 76 and 84 in the frame 32. The lip 74 on the first locking portion 70 projects through the slot 76 sufficiently to remain within the slot 76 throughout such deflection of the panel 50, and thereby to remain interlocked with the frame 32. However, the lips 82 on the second locking portions 72 do not project through the slots 84 sufficiently to remain within the slots 84 throughout such deflection of the panel 50. Therefore, the second locking portions 72 become disengaged from the frame 32 without rupturing, as shown in solid lines in FIG. 2. The deployment door 56 is then free to open pivotally about the axis 59 at the hinge 58 without rupturing, as shown in dashed lines in FIG. 2, as the inflation fluid continues to inflate the air bag 14 outward past the deployment door 56.

In accordance with a particular feature of the present invention, a recessed inner side surface 120 of the panel 50 defines a groove 122. The groove 120 is generally parallel to the pivotal axis 59, and extends along the length of the deployment door 56 at a location approximately midway between the first and second locking portions 70 and 72. A thinned section 124 of the molded plastic material extends along the door 56 coextensively with the groove 122. This configuration causes bending stresses to concentrate in the thinned section 124 when the panel 50 is bowed outward by the inflating air bag 14. A concentration of stresses in the thinned section 124 promotes bending of the door 56 pivotally about a fold line 125 extending along the length of the thinned section 124. Such bending facilitates movement of the second locking portions 72 outward of the slots 84.

A second embodiment of the present invention comprises an alternative air bag module 200, as shown in FIG. 3. Like the module 16 described above, the module 200 includes a reaction structure 202 containing an air bag 204 and an inflator 206, and further includes a deployment structure 208 for concealing the other parts of the module 200 from view.

The deployment structure 208 includes a generally rectangular panel 212 with opposite side edges 214 and opposite end edges 216 (one of which is visible in the end view of FIG. 3). The panel 212 defines a rectangular deployment door 218, as well as a deflectable hinge 220 for movement of the door 218 pivotally about an axis 221, in the manner described above with reference to the panel 50.

A frame portion 222 of the reaction structure 202 has a rim 224 defining a deployment opening 226. First and second locking portions 230 and 232 of the deployment structure 208 project from the panel 212 through the deployment opening 226. The first and second locking portions 230 and 232 of the deployment structure 208 are interlocked with the frame 222 at opposite sides of the opening 226 in the manner described above with reference to the first and second locking portions 70 and 72 of the deployment structure 24.

The deployment structure 208 further has a plurality of third locking portions 234 projecting from the panel 212 through the deployment opening 226. These include a pair of third locking portions 234 near the end edge 216 of the panel 212 that is visible in FIG. 3, and a substantially identical pair of third locking portions 234 (not shown) in reversed orientations near the opposite end edge 216 of the panel 212. The first and third locking portions 230 and 234 of the deployment structure 208 are releasably interlocked with the frame 222 in the same manner.

When the inflating air bag 204 moves outward against the panel 212, the inflation fluid pressure forces applied by the air bag 204 induce bending stresses that bow the panel 212 outward along the length, as well as across the width, of the deployment door 218. Such deflection of the panel 212 moves the two pairs of third locking portions 234 toward each other in opposite directions extending lengthwise of the deployment door 218. The third locking portions 234 are thus moved fully out of interlocked engagement with the frame 220 upon deflection of the deployment structure 208 without rupturing of the deployment structure 208.

As viewed in FIG. 5, a recessed inner side surface 240 of the panel 212 defines a groove 242 like the groove 120 described above. In a similar manner, an additional recessed inner side surface 244 defines an additional groove 246. The additional groove 246 is generally perpendicular to the pivotal axis 221, and extends across the width of the deployment door 218 at a location approximately midway between the two pairs of third locking portions 234. A thinned section 248 (FIG. 5) of the molded plastic material extends across the door 218 coextensively with the additional groove 246. When the inflating air bag 204 moves outward against the panel 212, a concentration of bending stresses in the thinned section 248 facilitates disengagement of the third locking portions 234 by promoting bending of the door 218 about a corresponding fold line 249.

A third embodiment of the present invention comprises another alternative air bag module 300, as shown in FIG. 4. Like the modules 16 and 200 described above, the module 300 includes a reaction structure 302 containing an air bag 304 and an inflator 306, and further includes a deployment structure 308 for covering the other parts of the module 300.

The deployment structure 308 in the third embodiment has many parts that are substantially the same as corresponding parts of the deployment structure 24 in the first embodiment. This is indicated by the use of the same reference numbers for such corresponding parts in FIGS. 4 and 1. The deployment structure 308 thus has a panel portion 50 extending across a deployment opening 310 in the reaction structure 302, and has first and second locking portions 70 and 72 projecting from the panel 50 into interlocked engagement with a frame portion 312 of the reaction structure 302.

The deployment structure 308 further has a deflectable release portion in the form of a scrim 320. The scrim 320 extends across the deployment opening 310 from the first locking portion 70 to the second locking portions 72, and is fixed to the locking portions 70 and 72 by a corresponding plurality of adhesive bonds 322. The scrim 320 is thus interposed between the air bag 304 and the panel 50 at a location spaced from the panel 50.

When the deployment structure 308 is being installed on the reaction structure 302, the first and second locking portions 70 and 72 are received in corresponding slots 330 and 332 in the frame 312 in the manner described above with reference to the slots 76 and 84 in the frame 32. The scrim 320 is then received over the folded air bag 304 in a taut condition so as not to have any slack between the locking portions 70 and 72 at the opposite sides of the deployment opening 310. In accordance with this feature of the present invention, the scrim 320 can be suspended by and between the locking portions 70 and 72 in a taut condition before the deployment structure 308 is installed on the reaction structure 302. However, the scrim 320 shown in FIG. 4 is initially suspended loosely between the locking portions 70 and 72. The slack in the suspended scrim 320 is taken up as the scrim 320 is stretched over the folded air bag 304 upon installation of the deployment structure 308 on the reaction structure 302.

The air bag 304 applies fluid pressure forces outward against the scrim 320 as inflation fluid begins to flow from the inflator 306 into the air bag 304. The fluid pressure forces bow the scrim 320 outward of the deployment opening 310, and thus impart tension to the scrim 302 between the locking portions 70 and 72 of the deployment structure 308. This causes the scrim 320 to transmit fluid pressure forces from the air bag 304 to the locking portions 70 and 72.

More specifically, the scrim 320 applies first and second fluid pressure forces substantially equally and oppositely against the first and second locking portions 70 and 72, respectively, so as to move them oppositely toward each other across the deployment opening 310. However, as in the first embodiment of the present invention, locking portions 70 and 72 in the third embodiment are configured such that the first locking portion 70 moves only partially out of interlocked engagement with the frame 312, whereas the second locking portions 72 move fully out of interlocked engagement with the frame 312. The deployment door 56 is thus opened by the inflating air bag 304 without rupturing of the deployment structure 308.

The invention has been described with reference to preferred embodiments. From the foregoing description, those skilled in the art may perceive improvements, changes and modifications. For example, the invention comprises a frame that defines a deployment opening. Although each frame in the preferred embodiments is part of a reaction structure for supporting the inflator in a vehicle, such a frame could be part of an instrument panel, a door panel, or any other structure that has a deployment opening for an inflatable vehicle occupant protection device. Accordingly, other inflatable vehicle occupant protection devices that can be used in accordance with the present invention include, for example, inflatable knee bolsters, inflatable head liners or side curtains, and knee bolsters operated by inflatable air bags. Such improvements, changes and modifications within the skill of the art are intended to be covered by the appended claims.

Having described the invention, the following is claimed:

1. Apparatus comprising:

a frame structure defining a deployment opening;

an inflatable vehicle occupant protection device aligned with said deployment opening; and a deployment structure extending across said deployment opening, said deployment structure having first and second locking portions in releasably interlocked engagement with said frame structure at locations spaced apart across said deployment opening;

said deployment structure being configured to undergo non-rupturing deflection under the influence of inflation fluid pressure forces applied by said protection device, said non-rupturing deflection of said deployment structure moving each of said locking portions outward of said interlocked engagement;

said first locking portion being configured to move only partially out of said interlocked engagement upon said non-rupturing deflection of said deployment structure, said second locking portion being configured to move fully out of said interlocked engagement upon said non-rupturing deflection of said deployment structure.

2. Apparatus as defined in claim 1 wherein said first and second locking portions of said deployment structure are received in first and second slots in said frame structure, respectively, and are configured to move outward of said slots upon said non-rupturing deflection of said deployment structure, said first locking portion being configured to remain in said first slot throughout said non-rupturing deflection of said deployment structure, said second locking portion being configured to move fully out of said second slot upon said non-rupturing deflection of said deployment structure.

3. Apparatus as defined in claim 1 wherein said deployment structure includes a deployment door and a hinge defining a pivotal axis for said door, said door having means for defining a fold line generally parallel to said axis, said non-rupturing deflection of said deployment structure comprising deflection of said door pivotally about said fold line.

4. Apparatus as defined in claim 3 wherein said second locking portion of said deployment structure is one of a plurality of second locking portions that are spaced from each other in a row generally parallel to said fold line.

5. Apparatus as defined in claim 3 wherein said door further has means for defining an additional fold line which is generally perpendicular to said axis, said non-rupturing deflection of said deployment structure further comprising deflection of said door pivotally about said additional fold line.

6. Apparatus as defined in claim 1 wherein said deployment structure further has a deflectable release portion extending across said deployment opening from said first locking portion to said second locking portion so as to transmit first and second inflation fluid pressure forces from said protection device to said first and second locking portions, respectively, said first locking portion being configured to move partially out of said interlocked engagement with said frame structure when subjected to said first inflation fluid pressure force, said second locking portion being configured to move fully out of said interlocked engagement with said frame structure when subjected to said second inflation fluid pressure force.

7. Apparatus as defined in claim 6 wherein said release portion of said deployment structure is configured to apply said inflation fluid pressure forces substantially equally and oppositely to said locking portions.

8. Apparatus as defined in claim 6 wherein said release portion of said deployment structure comprises a scrim which is connected between said locking portions so as to be stressed in tension by said protection device upon inflation of said protection device outward of said deployment opening.

9. Apparatus as defined in claim 8 wherein said scrim is taut between said locking portions prior to inflation of said protection device.

10. Apparatus comprising:
a frame structure defining a deployment opening;
an inflatable vehicle occupant protection device aligned with said deployment opening; and
a deployment structure extending across said deployment opening, said deployment structure having a locking portion in releasably interlocked engagement with said frame structure, said locking portion being configured to move fully out of said interlocked engagement upon non-rupturing deflection of said deployment structure under the influence of inflation fluid pressure forces applied by said protection device;
said deployment structure including a deployment door and a hinge defining a pivotal axis for said door, said door having means for defining a fold line at a location spaced from said hinge, said non-rupturing deflection of said deployment structure comprising deflection of said door pivotally about said fold line,
said apparatus further including means for defining an additional fold line which is generally perpendicular to said axis, said non-rupturing deflection of said deployment structure comprising deflection of said door pivotally about said additional fold line.

11. Apparatus as defined in claim 10 wherein said fold line is generally parallel to said axis.

12. Apparatus comprising:
a frame structure defining a deployment opening; and
a deployment structure for an inflatable vehicle occupant protection device, said deployment structure having a panel portion, locking portions, and a deflectable release portion, said deployment structure extending across said deployment opening;
said panel portion of said deployment structure including a deployment door and a deflectable hinge for said deployment door;
said locking portions of said deployment structure projecting from said panel portion at locations spaced apart across said deployment door and in releasably interlocked engagement with said frame structure, one of said locking portions configured to move only partially out of said interlocked engagement and another of said locking portions configured to move fully out of said interlocked engagement;
said release portion of said deployment structure spanning said locking portions at a location spaced from said panel portion.

13. Apparatus as defined in claim 12 wherein said release portion of said deployment structure comprises a scrim.

14. Apparatus as defined in claim 13 wherein said scrim is suspended by and between said locking portions.

15. Apparatus as defined in claim 13 wherein said scrim is taut between said locking portions.

16. Apparatus comprising:
a frame structure defining a deployment opening;
an inflatable vehicle occupant protection device aligned with said deployment opening; and
a deployment structure having a panel portion extending across said deployment opening;
said deployment structure having first and second locking portions projecting from said panel portion into releasably interlocked engagement with said frame structure at locations s paced apart across said deployment opening, said first locking portion configured to move only partially out of said interlocked engagement and said second locking portion configured to move fully out of said interlocked engagement;
said deployment structure further having a deflectable release portion, said release portion extended across said deployment opening between said locking portions at a location spaced from said panel portion, whereby said release portion transmits first and second inflation fluid pressure forces from said protection device to said first and second locking portions, respectively, upon inflation of said protection device outward of said deployment opening.

17. Apparatus as defined in claim 16 wherein said release portion of said deployment structure is configured to apply said inflation fluid pressure forces substantially equally and oppositely to said locking portions.

18. Apparatus as define in claim 16 wherein said release portion of said deployment structure comprises a scrim which is connected between said locking portions so as to be stressed in tension by said protection device upon inflation of said protection device outward of said deployment opening.

19. Apparatus as defined in claim 18 wherein said scrim is taut between said locking portions prior to inflation of said protection device.

* * * * *